(12) United States Patent
Miyake et al.

(10) Patent No.: US 8,034,894 B2
(45) Date of Patent: Oct. 11, 2011

(54) TERMINAL MODIFIED POLYCARBONATE AND MANUFACTURING PROCESS THEREOF

(75) Inventors: Toshiyuki Miyake, Chiyoda-ku (JP); Masami Kinoshita, Chiyoda-ku (JP); Mizuho Saito, Chiyoda-ku (JP); Katsuhiko Hironaka, Chiyoda-ku (JP)

(73) Assignee: Teijin Limited, Osaka (JP)

( * ) Notice: Subject to any disclaimer, the term of this patent is extended or adjusted under 35 U.S.C. 154(b) by 50 days.

(21) Appl. No.: 12/530,437

(22) PCT Filed: Mar. 5, 2008

(86) PCT No.: PCT/JP2008/054423
§ 371 (c)(1),
(2), (4) Date: Sep. 8, 2009

(87) PCT Pub. No.: WO2008/108492
PCT Pub. Date: Sep. 12, 2008

(65) Prior Publication Data
US 2010/0105854 A1    Apr. 29, 2010

(30) Foreign Application Priority Data
Mar. 8, 2007    (JP) .................... 2007-058448

(51) Int. Cl.
C08G 64/02    (2006.01)
(52) U.S. Cl. ........ 528/370; 528/196; 528/212; 528/372; 528/403; 528/405; 528/406; 528/407
(58) Field of Classification Search .................. None
See application file for complete search history.

(56) References Cited

U.S. PATENT DOCUMENTS

| | | | |
|---|---|---|---|
| 4,506,066 A | 3/1985 | Medem et al. | |
| 6,140,457 A * | 10/2000 | LeGrand et al. | 528/196 |
| 6,258,922 B1 | 7/2001 | Okamoto et al. | |
| 6,288,205 B1 | 9/2001 | Miyamoto et al. | |
| 7,365,148 B2 * | 4/2008 | Ono et al. | 528/196 |
| 7,718,755 B2 * | 5/2010 | Chatterjee et al. | 528/196 |

FOREIGN PATENT DOCUMENTS

| | | | |
|---|---|---|---|
| CN | 1286712 A | 3/2001 | |
| JP | 56-55425 A | 5/1981 | |
| JP | 56-110723 A | 9/1981 | |
| JP | 2003-292603 A | 10/2003 | |
| JP | 2006-232897 A | 9/2006 | |
| WO | 2004/111106 A1 | 12/2004 | |
| WO | WO 2004/111106 | * 12/2004 | |
| WO | 2007/013463 A1 | 2/2007 | |
| WO | 2007/063823 A1 | 6/2007 | |
| WO | 2007/148604 A1 | 12/2007 | |

OTHER PUBLICATIONS

"Characterization of Alkyl Phenols in Cashew (*Anacardium occidentale*) Products and Assay of their Antioxidant Capacity" authored by Trevisan et al. and puglished in Food and Chemical Toxicology (2006) 44, 188-197.*

"Cyclic and Noncyclic Polycarbonates of Isosorbide (1,4:3,6-Dianhydro-D-glucitol)" authored by Chatti et al., and published in Macromolecules (2006) 39, 9064-9070.*

* cited by examiner

*Primary Examiner* — Marc Zimmer
(74) *Attorney, Agent, or Firm* — Sughrue Mion, PLLC

(57) ABSTRACT

A terminal modified polycarbonate having a high content of biogenic matter, excellent heat resistance, heat stability, moldability and moist absorption resistance and high surface energy and a manufacturing process thereof are provided. The terminal modified polycarbonate has a main chain essentially composed of a recurring unit represented by the following formula (1):

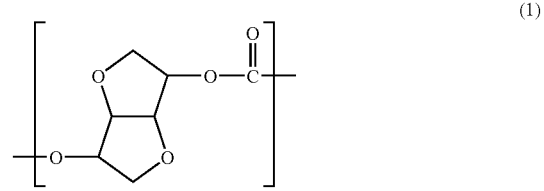

(1)

has a specific viscosity at 20° C. of a solution obtained by dissolving 0.7 g of the polycarbonate in 100 ml of methylene chloride of 0.2 to 0.5, and contains a terminal group represented by the following formula (2) or (3) in an amount of 0.3 to 9 wt % based on the main chain:

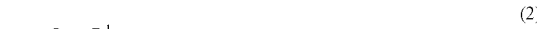

(2)

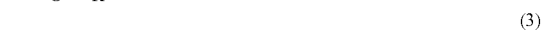

(3)

18 Claims, No Drawings

TERMINAL MODIFIED POLYCARBONATE AND MANUFACTURING PROCESS THEREOF

FIELD OF THE INVENTION

The present invention relates to a terminal modified polycarbonate. More specifically, it relates to a polycarbonate which contains a recurring unit derived from a sugar which is biogenic matter and has excellent heat stability, heat resistance, moldability and moisture absorption resistance.

BACKGROUND OF THE ART

Polycarbonates are polymers obtained by combining aromatic or aliphatic dioxy compounds by means of a carbonate. Out of these, a polycarbonate obtained from 2,2-bis(4-hydroxyphenyl)propane (commonly called "bisphenol A") (may be referred to as "PC-A" hereinafter) is used in many fields because it has excellent transparency, heat resistance and impact resistance.

Polycarbonates are generally manufactured from raw materials obtained from oil resources. The depletion of oil resources is now apprehended, and a polycarbonate manufactured from a raw material obtained from biogenic matter such as plants is desired. Therefore, a polycarbonate resin obtained from an ether diol which can be manufactured from a sugar is now under study.

For example, an ether diol represented by the following formula (5) is easily formed from biogenic matter such as a sugar or starch.

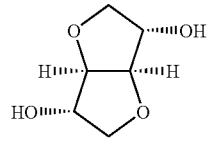

(5)

It is known that this ether diol has three stereoisomers. They are 1,4:3,6-dianhydro-D-sorbitol (to be referred to as "isosorbide" hereinafter) represented by the following formula (9), 1,4:3,6-dianhydro-D-mannitol (to be referred to as "isomannide" hereinafter) represented by the following formula (10), and 1,4:3,6-dianhydro-L-iditol (to be referred to as "isoidide" hereinafter) represented by the following formula (11).

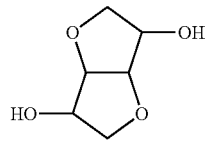

(9)

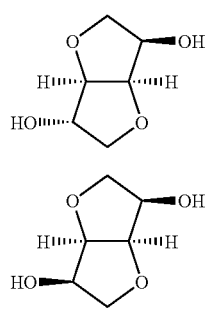

(10)

(11)

Isosorbide, isomannide and isoidide are obtained from D-glucose, D-mannose and L-idose, respectively. For example, isosorbide can be obtained by hydrogenating D-glucose and then dehydrating it with an acid catalyst.

Out of the above ether diols represented by the formula (5), the introduction of isosorbide into a polycarbonate has been studied. JP-A 56-55425 (patent document 1) discloses a homopolycarbonate containing isosorbide. This homopolycarbonate has high specific viscosity and extremely high melt viscosity due to the rigid structure of its isosorbide skeleton, thereby making it difficult to mold it.

To overcome the above defect of the homopolycarbonate, copolymerization with various bishydroxy compounds is proposed. JP-A 56-110723 (patent document 2) proposes a copolycarbonate of isosorbide and an aromatic bisphenol. When the aromatic bisphenol is copolymerized, heat stability is improved but melt viscosity is not improved, whereby moldability becomes unsatisfactory. The aromatic bisphenol has a problem that it is derived from petroleum.

JP-A 2003-292603, WO2004/111106 and JP-A 2006-232897 (patent documents 3 to 5) propose a copolycarbonate of isosorbide and an aliphatic diol. When the aliphatic diol is copolymerized, melt viscosity lowers and moldability improves. However, most aliphatic diols are derived from petroleum, and diols which can be biogenic matter are limited to those having a relatively small number of carbon atoms, such as propanediol and butanediol. Since the boiling points of these aliphatic diols are lower than that of isosorbide, when they are polymerized by a melt ester interchange method, unreacted aliphatic diols are distilled off from a reaction system and the composition ratios of the obtained polymers become different from the charge ratios. When an aliphatic diol is copolymerized, heat stability tends to lower as well.

An isosorbide-containing polycarbonate contains a large number of oxygen atoms and has higher polarity than a polycarbonate obtained from a diol having no ether moiety, such as PC-A. Therefore, the isosorbide-containing polycarbonate has higher hygroscopic nature than PC-A, whereby it readily causes the deterioration of the dimensional stability of its molded product by moisture absorption and the deterioration of the heat resistance of the molded product at the time of wet heating. Further, as the isosorbide-containing polycarbonate has low surface energy, its molded product is easily stained and has low abrasion resistance. This surface energy can be evaluated by the contact angle with water.

The isosorbide-containing polycarbonate has still room for the improvement of heat stability and moldability as described above. The isosorbide-containing polycarbonate also has room for the improvement of some defects caused by low surface energy including low moisture absorption resistance.

(patent document 1) JP-A 56-55425
(patent document 2) JP-A 56-110723
(patent document 3) JP-A 2003-292603
(patent document 4) WO2004/111106
(patent document 5) JP-A 2006-232897

DISCLOSURE OF THE INVENTION

It is therefore an object of the present invention to provide a polycarbonate which has a high content of biogenic matter.

It is another object of the present invention to provide a polycarbonate which is excellent in heat resistance, heat stability, moldability and moisture absorption resistance and has high surface energy. It is still another object of the present invention to provide a film which has a low photoelastic constant, high differential phase developability and phase difference controllability, and excellent view angle characteristics, heat resistance and heat stability.

The inventors of the present invention have found that a polycarbonate which has a main chain composed of a recurring unit represented by the following formula (1) and into which a specific terminal group has been introduced has a high content of biogenic matter, excellent heat resistance, heat stability, moldability and moisture absorption resistance, and high surface energy. The present invention has been accomplished based on this finding.

That is, the present invention is a terminal modified polycarbonate which has a main chain essentially composed of a recurring unit represented by the following formula (1):

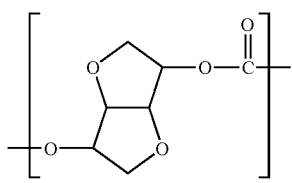
(1)

has a specific viscosity at 20° C. of a solution obtained by dissolving 0.7 g of the polycarbonate in 100 ml of methylene chloride of 0.2 to 0.5, and contains a terminal group represented by the following formula (2) or (3) in an amount of 0.3 to 9 wt % based on the main chain:

—O—R$^1$ (2)

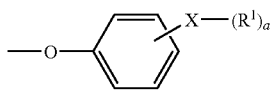
(3)

wherein R$^1$ is an alkyl group having 4 to 30 carbon atoms, aralkyl group having 7 to 30 carbon atoms, perfluoroalkyl group having 4 to 30 carbon atoms or a group represented by the following formula (4):

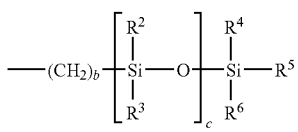
(4)

wherein R$^2$, R$^3$, R$^4$, R$^5$ and R$^6$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms, b is an integer of 0 to 3, and c is an integer of 4 to 100, X is at least one bond selected from the group consisting of a single bond, ether bond, thioether bond, ester bond, amino bond and amide bond, and a is an integer of 1 to 5.

Further, the present invention is a process of manufacturing a terminal modified polycarbonate, comprising reacting an ether diol (component A) represented by the following formula (5):

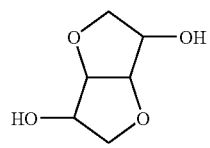
(5)

a diester carbonate (component B) and 0.3 to 15 wt % based on the component A of a hydroxyl compound (component C) represented by the following formula (6) or (7) with one another:

HO—R$^1$ (6)

(7)

wherein R$^1$ is an alkyl group having 4 to 30 carbon atoms, aralkyl group having 7 to 30 carbon atoms, perfluoroalkyl group having 4 to 30 carbon atoms or a group represented by the following formula (4):

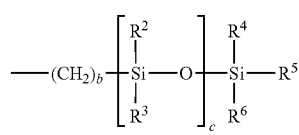
(4)

wherein R$^2$, R$^3$, R$^4$, R$^5$ and R$^6$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms, and b is an integer of 0 to 3, c is an integer of 4 to 100, X is at least one bond selected from the group consisting of a single bond, ether bond, thioether bond, ester bond, amino bond and amide bond, and a is an integer of 1 to 5.

Further, the present invention is a process of manufacturing a polycarbonate, comprising reacting an ether diol (component A) represented by the following formula (5):

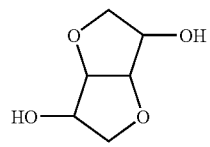
(5)

with phosgene (component D) in an inert solvent in the presence of an acid binder, wherein a hydroxyl compound (component C) represented by the following formula (6) or (7):

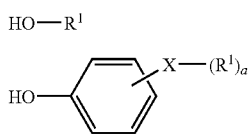  (6)

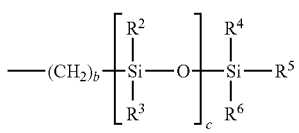  (7)

wherein R¹ is an alkyl group having 4 to 30 carbon atoms, aralkyl group having 7 to 30 carbon atoms, perfluoroalkyl group having 4 to 30 carbon atoms or a group represented by the following formula (4):

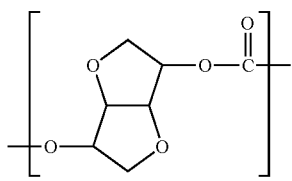  (4)

wherein $R^2$, $R^3$, $R^4$, $R^5$ and $R^6$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms, b is an integer of 0 to 3, and c is an integer of 4 to 100, X is at least one bond selected from the group consisting of a single bond, ether bond, thioether bond, ester bond, amino bond and amide bond, and a is an integer of 1 to 5, is reacted as a terminal capping agent.

BEST MODE FOR CARRYING OUT THE INVENTION

The present invention will be described in detail hereinunder.

<Terminal Modified Polycarbonate>

(Main Chain)

The terminal modified polycarbonate of the present invention has a main chain essentially composed of a recurring unit represented by the following formula (1). That is, the content of the recurring unit represented by the following formula (1) in the main chain is preferably 95 to 100 mol %, more preferably 98 to 100 mol %.

(1)

The recurring unit represented by the formula (1) is preferably a unit derived from isosorbide, isomannide or isoidide. It is particularly preferably a unit derived from isosorbide (1,4; 3,6-dianhydro-D-sorbitol).

(Specific Viscosity)

The terminal modified polycarbonate of the present invention has a specific viscosity at 20° C. of a solution obtained by dissolving 0.7 g of the polycarbonate in 100 ml of methylene chloride of 0.2 to 0.5, preferably 0.2 to 0.45, more preferably 0.22 to 0.4. When the specific viscosity is lower than 0.2, it is difficult to provide sufficiently high mechanical strength to the obtained molded product. When the specific viscosity is higher than 0.5, the proportion of the terminal group lowers inevitably, thereby making it impossible to obtain satisfactory terminal modification effects, and the melt viscosity becomes too high, whereby the melting temperature required for molding becomes higher than the decomposition temperature disadvantageously.

(Melt Viscosity)

The terminal modified polycarbonate of the present invention has a melt viscosity measured with a capillary rheometer at 250° C. of preferably $0.2 \times 10^3$ to $2.2 \times 10^3$ Pa·s, more preferably $0.2 \times 10^3$ to $1.8 \times 10^3$ Pa·s at a shear rate of 600 sec$^{-1}$. When the melt viscosity falls within this range, mechanical strength and moldability become satisfactory.

(Terminal Group)

The terminal modified polycarbonate of the present invention contains a terminal group represented by the following formula (2) or (3).

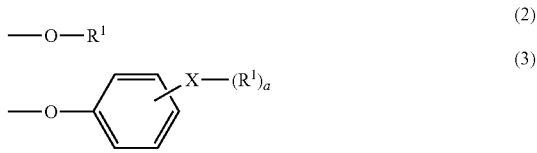

In the formulas (2) and (3), R¹ is an alkyl group having 4 to 30 carbon atoms, aralkyl group having 7 to 30 carbon atoms, perfluoroalkyl group having 4 to 30 carbon atoms or a group represented by the following formula (4).

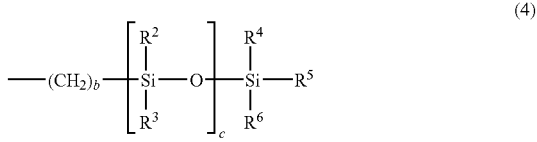  (4)

The number of carbon atoms of the alkyl group of R¹ is preferably 4 to 22, more preferably 8 to 22. Examples of the alkyl group include hexyl group, octyl group, nonyl group, decyl group, undecyl group, dodecyl group, pentadecyl group, hexadecyl group and octadecyl group.

The number of carbon atoms of the aralkyl group of R¹ is preferably 8 to 20, more preferably 10 to 20. Examples of the aralkyl group include benzyl group, phenethyl group, methylbenzyl group, 2-phenylpropan-2-yl group and diphenylmethyl group.

The number of carbon atoms of the perfluoroalkyl group of R¹ is preferably 2 to 20. Examples of the perfluoroalkyl group include 4,4,5,5,6,6,7,7,7-nonafluoroheptyl group, 4,4,5,5,6,6,7,7,8,8,9,9,9-tridecafluorononyl group and 4,4,5,5,6,6,7,7,8,8,9,9,10,10,11,11,11-heptadecafluoroun decyl group.

In the formula (4), $R^2$, $R^3$, $R^4$, $R^5$ and $R^6$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms.

Examples of the alkyl group having 1 to 10 carbon atoms in the formula (4) include methyl group, ethyl group, propyl group, butyl group and heptyl group. Examples of the cycloalkyl group having 6 to 20 carbon atoms include cyclohexyl group, cyclooctyl group, cyclohexyl group and cyclodecyl group. Examples of the alkenyl group having 2 to 10 carbon atoms include ethenyl group, propenyl group, butenyl group and heptenyl group. Examples of the aryl group having 6 to 10 carbon atoms include phenyl group, tolyl group, dimethylpheyl group and naphthyl group. Examples of the aralkyl group having 7 to 20 carbon atoms include benzyl group, phenethyl group, methylbenzyl group, 2-phenylpropan-2-yl group and diphenylmethyl group.

In the formula (4), preferably, $R^2$, $R^3$, $R^4$, $R^5$ and $R^6$ are each independently at least one group selected from the group consisting of an alkyl group having 1 to 10 carbon atoms and aryl group having 6 to 10 carbon atoms. Particularly preferably, $R^2$, $R^3$, $R^4$, $R^5$ and $R^6$ are each independently at least one group selected from the group consisting of methyl group and phenyl group.

"b" is an integer of 0 to 3, preferably 1 to 3, more preferably 2 or 3. "c" is an integer of 4 to 100, preferably 4 to 50, more preferably 8 to 50.

X in the formula (3) is at least one bond selected from the group consisting of a single bond, ether bond, thioether bond, ester bond, amino bond and amide bond. X is preferably at least one bond selected from the group consisting of a single bond, ether bond and ester bond. It is particularly preferably a single bond or an ester bond.

"a" is an integer of 1 to 5, preferably 1 to 3, more preferably 1.

The terminal group represented by the above formula (2) or (3) is preferably derived from biogenic matter. Examples of the biogenic matter include long-chain alkyl alcohols having 14 or more carbon atoms, such as cetanol, stearyl alcohol and behenyl alcohol.

The content of the terminal group represented by the formula (2) or (3) is 0.3 to 9 wt %, preferably 0.3 to 7.5 wt %, more preferably 0.5 to 6 wt % based on the main chain of the polymer. When the content of the terminal group represented by the above formula (2) or (3) falls within the above range, terminal modification effects (moldability, large contact angle and moisture absorption resistance) are advantageously obtained.

(Contact Angle with Water)

The contact angle with water of the terminal modified polycarbonate of the present invention is preferably 70 to 180°, more preferably 72 to 180°. When the contact angle with water falls within the above range, the obtained polycarbonate is preferred in terms of antifouling property, abrasion resistance and releasability.

(Water Absorption Coefficient)

The water absorption coefficient at 23° C. after 24 hours of the terminal modified polycarbonate of the present invention is preferably 0.8% or less, more preferably 0.75% or less. When the water absorption coefficient falls within the above range, the obtained terminal modified polycarbonate is preferred in terms of moist heat resistance and low dimensional change rate.

<Process of Manufacturing Terminal Modified Polycarbonate (I)>

The terminal modified polycarbonate of the present invention can be manufactured by reacting an ether diol (component A) represented by the following formula (5):

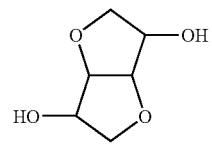

a diester carbonate (component B) and 0.3 to 15 wt % based on the component A of a hydroxyl compound (component C) represented by the following formula (6) or (7) with one another (manufacturing process (I)):

$$HO-R^1 \quad (6)$$

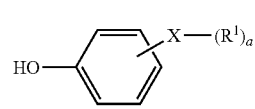

(Ether Diol: Component A)

The ether diol (component A) is preferably one of isosorbide, isomannide and isoidide. These ether diols derived from sugars are also obtained from biomass in the natural world and so-called "regenerable resources". Isosorbide can be manufactured by hydrogenating D-glucose obtained from starch and then dehydrating it. The other ether diols are obtained through a similar reaction except for starting materials. The component A is particularly preferably isosorbide (1,4; 3,6-dianhydro-D-sorbitol). Isosorbide is an ether diol which can be easily made from starch, can be acquired abundantly as a resource and is superior to isommanide and isoidide in production ease, properties and application range.

Another aliphatic diol or aromatic bisphenol may be copolymerized as long as the characteristic properties of the obtained polycarbonate resin of the present invention are not impaired. The proportion of the another aliphatic diol or aromatic bisphenol is preferably 5 to 0 mol %, more preferably 2 to 0 mol %.

The aliphatic diol is preferably an aliphatic diol having 2 to 20 carbon atoms, more preferably an aliphatic diol having 3 to 15 carbon atoms. Specific examples of the aliphatic diol include linear diols such as 1,3-propanediol, 1,4-butanediol, 1,5-pentanediol and 1,6-hexanediol, and alicyclic alkylenes such as cyclohexanediol and cyclohexanedimethanol. Out of these, 1,3-propanediol, 1,4-butanediol, hexanediol and cyclohexanedimethanol are preferred.

Examples of the aromatic bisphenol include 2,2-bis(4-hydroxyphenyl)propane (commonly called "bisphenol A"), 1,1-bis(4-hydroxyphenyl)cyclohexane, 1,1-bis(4-hydroxyphenyl)-3,3,5-trimethylcyclohexane, 4,4'-(m-phenylenediisopropylidene)diphenol, 9,9-bis(4-hydroxy-3-methylphenyl)fluorene, 2,2-bis(4-hydroxy-3-methylphenyl)propane, 2,2-bis(4-hydroxyphenyl)-4-methylpentane, 1,1-bis(4-hydroxyphenyl)decane and 1,3-bis{2-(4-hydroxyphenyl)propyl}benzene.

Another diol residue may be contained, such as an aromatic diol exemplified by dimethanolbenzene and diethanolbenzene.

(Diester Carbonate: Component B)

The diester carbonate (component B) is a diester carbonate having an aryl group having 6 to 12 carbon atoms or aralkyl group having 6 to 12 carbon atoms which may be substituted, or alkyl group having 1 to 4 carbon atoms. Specific examples of the diester carbonate include diphenyl carbonate, bis(chlorophenyl)carbonate, m-cresyl carbonate, dinaphthyl carbonate, bis(diphenyl)carbonate, dimethyl carbonate, diethyl carbonate and dibutyl carbonate. Out of these, diphenyl carbonate is preferred.

The amount of the diester carbonate (component B) is preferably 1.05 to 0.97 mol, more preferably 1.03 to 0.97 mol, more preferably 1.03 to 0.99 mol based on 1 mol of the ether diol (component A). When the amount of the component B is larger than 1.05 mols, the ester carbonate residue remains as a terminal capping unit, whereby terminal modification is not carried out to the full, and a sufficiently high degree of polymerization cannot be obtained. When the amount of the component B is smaller than 0.97 mol, not only polymerization does not proceed but also an unreacted ether diol or hydroxyl compound remains.

(Hydroxyl Compound: Component C)

In the hydroxyl compound (component C) represented by the formula (6) or (7), $R^1$, X, a, $R^2$, $R^3$, $R^4$, $R^5$, $R^6$, b and c are the same as in the formulas (2) and (3). Hydroxyl compounds (component C) may be used alone or in combination of two or more. When two or more hydroxyl compounds are used in combination, the hydroxyl compound represented by the formula (6) or (7) may be used in combination with other hydroxyl compound(s). The hydroxyl compound (component C) improves the heat resistance, heat stability, moldability and water absorption resistance of the polycarbonate.

Since the terminal modified polycarbonate of the present invention has a recurring unit derived from a raw material obtained from a regenerable resource such as a plant in the structure of the main chain, the hydroxyl compounds constituting the terminal structure are preferably derived from biogenic matter such as plants. Hydroxyl compounds obtained from plants include long-chain alkyl alcohols having 14 or more carbon atoms (cetanol, stearyl alcohol and behenyl alcohol) obtained from vegetable oil.

The amount of the hydroxyl compound (component C) is preferably 0.3 to 15 wt %, more preferably 0.3 to 10 wt %, much more preferably 0.5 to 10 wt % based on the ether diol (component A). When the amount of the hydroxyl compound is smaller than 0.3 wt %, terminal modification effects are not obtained. When the amount of the hydroxyl compound is larger than 15 wt %, the amount of the terminal capping agent is too large, whereby a terminal modified polycarbonate having a degree of polymerization high enough for molding is not obtained. The time for adding the hydroxy compound (component C) may be either the initial stage of a reaction or the latter stage of the reaction.

The reaction can be carried out by melt polymerization. The melt polymerization can be carried out by distilling out an alcohol or phenol formed by an ester interchange reaction among the components A, B and C at a high temperature under a reduced pressure.

(Reaction Temperature)

The reaction temperature is preferably as low as possible in order to suppress the decomposition of the ether diol and obtain a resin which is little colored and has high viscosity. The polymerization temperature is preferably in the range of 180 to 280° C., more preferably 180 to 270° C. in order to promote the polymerization reaction properly.

Preferably, after the ether diol and the diester carbonate are heated at normal pressure to be pre-reacted with each other in the initial stage of the reaction, the pressure is gradually reduced until the pressure of the system becomes about $1.3\times10^{-3}$ to $1.3\times10^{-5}$ MPa in the latter stage of the reaction to facilitate the distillation-off of the formed alcohol or phenol. The reaction time is generally about 1 to 4 hours.

(Polymerization Catalyst)

A polymerization catalyst may be used to accelerate the polymerization rate. Examples of the polymerization catalyst include alkali metal compounds such as sodium hydroxide, potassium hydroxide, sodium carbonate, potassium carbonate, sodium hydrogen carbonate, sodium salts of a diphenol and potassium salts of a diphenol. Alkali earth metal compounds such as calcium hydroxide, barium hydroxide and magnesium hydroxide may also be used.

Nitrogen-containing basic compounds such as tetramethylammonium hydroxide, tetraethylammonium hydroxide, tetrabutylammonium hydroxide, trimethylamine and triethylamine may also be used.

Alkoxides of alkali metals and alkali earth metals, organic acid salts of alkali metals and alkali earth metals, zinc compounds, boron compounds, aluminum compounds, silicon compounds, germanium compounds, organic tin compounds, lead compounds, osmium compounds, antimony compounds, manganese compounds, titanium compounds and zirconium compounds may also be used. They may be used alone or in combination of two or more.

At least one compound selected from the group consisting of nitrogen-containing basic compounds, alkali metal compounds and alkali earth metal compounds is preferably used as the polymerization catalyst. Out of these, a combination of a nitrogen-containing basic compound and an alkali metal compound is particularly preferably used.

The amount of each of the polymerization catalysts is preferably selected from the range of $1\times10^{-9}$ to $1\times10^{-3}$ equivalent, more preferably selected from the range of $1\times10^{-8}$ to $5\times10^{-4}$ equivalent based on 1 mol of the diester carbonate (component B).

The reaction system is preferably maintained in a gas atmosphere such as nitrogen inactive to raw materials, reaction mixture and reaction product. Inert gases except nitrogen include argon. Additives such as an antioxidant may be further added as required.

(Catalyst Deactivator)

A catalyst deactivator may be added to the terminal modified polycarbonate of the present invention. Known catalyst deactivators may be used as the catalyst deactivator. Out of these, ammonium salts and phosphonium salts of sulfonic acid are preferred. Ammonium salts and phosphonium salts of dodecylbenzenesulfonic acid such as tetrabutylphosphonium salts of dodecylbenzenesulfonic acid are more preferred. Ammonium salts and phosphonium salts of paratoluenesulfonic acid such as tetrabutylammonium salts of paratoluenesulfonic acid are also preferred. Methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are preferably used as the ester of sulfonic acid. Out of these, tetrabutylphosphonium salts of dodecylbenzenesulfonic acid are most preferably used. The amount of the catalyst deactivator is preferably 0.5 to 50 mols, more preferably 0.5 to 10 mols, more preferably 0.8 to 5 mols based on 1 mol of the polymerization catalyst selected from alkali metal compounds and/or alkali earth metal compounds.

Therefore, it is preferred that the ether diol (component A), the diester carbonate (component B) and the hydroxy compound (component C) should be heated at normal pressure to be reacted with one another in the existence of a polymerization catalyst and then melt polycondensed while they are heated at 180 to 280° C. under a reduced pressure.

<Process of Manufacturing Terminal Modified Polycarbonate (II)>

The terminal modified polycarbonate of the present invention can be manufactured by reacting the ether diol (component A) with phosgene (component D) in an inert solvent in the presence of an acid binder such as pyridine. That is, the terminal modified polycarbonate of the present invention can be manufactured by reacting an ether diol (component A) represented by the following formula (5):

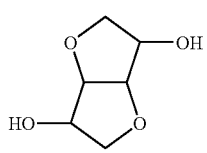

(5)

with phosgene (component D) in an inert solvent in the presence of an acid binder and using a hydroxy compound (component C) represented by the following formula (6) or (7) as a terminal capping agent (manufacturing process (II)):

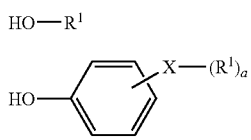

The components A and C are the same as those used in the manufacturing process (I). The ether diol (component A) is preferably isosorbide (1,4; 3,6-dianhydro-D-sorbitol). The hydroxy compound (component C) is preferably derived from biogenic matter. Heat stability is improved by using the hydroxy compound (component C) represented by the formula (6) or (7) as a terminal capping agent.

(Acid Binder)

The acid binder is preferably at least one selected from the group consisting of pyridine, quinoline and dimethylaniline. The acid binder is particularly preferably pyridine. The amount of the acid binder is preferably 2 to 100 mols, more preferably 2 to 50 mols based on 1 mol of phosgene (component D).

(Inert Solvent)

Examples of the inert solvent include hydrocarbons such as benzene, toluene and xylene, and halogenated hydrocarbons such as methylene chloride, chloroform, dichloroethane, chlorobenzene and dichlorobenzene. Out of these, halogenated hydrocarbons such as methylene chloride, chloroform, dichloroethane, chlorobenzene and dichlorobenzene are preferred. Methylene chloride is most preferred. The reaction temperature is preferably 0 to 40° C., more preferably 5 to 30° C. The reaction time is generally a few minutes to a few days, preferably 10 minutes to 5 hours.

<Molded Product>

The present invention includes a molded product such as a film formed of the above terminal modified polycarbonate. The film can be used for an optical purpose.

The film of the present invention can be manufactured by a solution casting method in which a solution obtained by dissolving the terminal modified polycarbonate of the present invention in a solvent is cast or a melt film forming method in which the terminal modified polycarbonate of the present invention is molten and cast as it is.

To form a film by the solution casting method, a halogen-based solvent, especially methylene chloride is preferably used as a solvent from the viewpoints of general applicability and production cost. A solution composition (dope) prepared by dissolving 10 parts by weight of the terminal modified polycarbonate of the present invention in 15 to 90 parts by weight of a solvent containing 60 wt % or more of methylene chloride is preferred. When the amount of the solvent is larger than 90 parts by weight, it may be difficult to obtain a cast film which has a large thickness and excellent surface smoothness and when the amount of the solvent is smaller than 15 parts by weight, the melt viscosity becomes too high, whereby it may be difficult to manufacture a film.

Another solvent may be added as required as long as film formability is not impaired besides methylene chloride. Examples of the solvent include alcohols such as methanol, ethanol, 1-propanol and 2-propanol, halogen-based solvents such as chloroform and 1,2-dichloroethane, aromatic solvents such as toluene and xylene, ketone-based solvents such as acetone, methyl ethyl ketone and cyclohexanone, ester-based solvents such as ethyl acetate and butyl acetate, and ether-based solvents such as ethylene glycol dimethyl ether.

In the present invention, after the dope is cast over a support substrate, a film can be obtained by heating it to evaporate the solvent. A glass substrate, metal substrate such as stainless steel or ferro type substrate, or plastic substrate such as PET substrate is used as the support substrate and the dope is cast over the support substrate uniformly with a doctor blade. A method in which the dope is extruded continuously onto a belt-like or drum-like support substrate from a die is commonly used in the industry.

The dope cast over the support substrate is preferably heated gradually from a low temperature to be dried so that foaming does not occur. Preferably, the dope is heated to remove most of the solvent so as to obtain a self-supporting film which is then removed from the support substrate and heated from both sides to be dried so as to remove the residual solvent. Since it is fairly possible that stress is applied to the film by a dimensional change caused by heat shrinkage in the drying step after the film is removed from the substrate, it is necessary to pay attention to the drying temperature and the film fixing conditions in film formation which requires the precise control of optical properties like an optical film for use in liquid crystal displays. In general, it is preferred that the film should be dried by increasing the temperature from (Tg−100° C.) to Tg of the polycarbonate in use stepwise after removal. When the film is dried at a temperature higher than Tg, the thermal deformation of the film occurs disadvantageously and when the film is dried at a temperature lower than (Tg−100° C.), the drying speed becomes too slow disadvantageously.

The amount of the residual solvent contained in the film obtained by the solution casting method is preferably 2 wt % or less, more preferably 1 wt % or less. When the amount is larger than 2 wt %, the glass transition point of the film greatly lowers disadvantageously.

To form a film by the melt film forming method, a melt is generally extruded from a T die to form a film. The film forming temperature which is determined by the molecular weight, Tg and melt flow characteristics of the polycarbonate is generally 180 to 350° C., preferably 200 to 320° C. When the temperature is too low, the viscosity becomes high, whereby the orientation and stress distortion of the polymer may remain and when the temperature is too high, problems such as heat deterioration, coloring and the formation of a die line (streak) from the T die may occur.

The thickness of the unstretched film obtained as described above which is not particularly limited and may be determined according to purpose is preferably 10 to 300 μm, more preferably 20 to 200 μm from the viewpoints of film production, physical properties such as toughness and cost.

The film of the present invention is preferably obtained by stretching an unstretched film by a known stretching method such as monoaxial stretching or biaxial stretching to orient the polymer. The film obtained by this stretching can be used as a phase difference film for liquid crystal displays. The stretching temperature is generally (Tg−20° C.) to (Tg+20° C.) close to Tg of the polymer, and the draw ratio is generally 1.02 to 3 times in the case of monoaxial stretching in the longitudinal direction. The thickness of the stretched film is preferably 20 to 200 μm.

The terminal modified polycarbonate of the present invention constituting the film has a photoelastic constant of preferably $25 \times 10^{-12}$ $Pa^{-1}$ or less, more preferably $20 \times 10^{-12}$ $Pa^{-1}$ or less. When the photoelastic constant is higher than $25 \times 10^{-12}$ $Pa^{-1}$, a phase difference may be resulted by tension generated when the optical film is laminated or by stress generated by a difference in dimensional stability from another material, whereby long-term stability may deteriorate due to a phenomenon such as light leakage or the reduction of contrast.

The wavelength dispersion of the phase difference values of the film of the present invention preferably satisfies the following expression (i), more preferably the following expression (ii).

$$1.010 < R(450)/R(550) < 1.070 \quad \text{(i)}$$

$$1.010 < R(450)/R(550) < 1.060 \quad \text{(ii)}$$

R(450) and R(550) are phase difference values within the film plane at wavelengths of 450 nm and 550 nm, respectively. When a phase difference film having a small wavelength dispersion of phase difference values is used, a liquid crystal display having excellent view angle characteristics and contrast in a VA (vertical alignment) mode is obtained.

The value (Δn=R(550)/film thickness (μm)) obtained by dividing the phase difference by the thickness of the film of the present invention satisfies preferably the following expression (iii), more preferably the following expression (iv) while it is unstretched.

$$\Delta n < 0.2 \quad \text{(iii)}$$

$$\Delta n < 0.15 \quad \text{(iv)}$$

The lower limit is not particularly limited and may be larger than "0".

Further, when the film is stretched at a temperature of (Tg−10° C.) to (Tg+10° C.) close to the Tg of the polymer, the relationship between Δn and the draw ratio satisfies preferably the following expression (v), more preferably the following expression (vi).

$$a \geq 8 \quad \text{(v)}$$

$$a \geq 8.5 \quad \text{(vi)}$$

In the above expressions, "a" is a value which satisfies the equation Δn(s)=a×s+b ("s" is a draw ratio, Δn(s) is Δn at a draw ratio "s", "a" is an inclination, and "b" is a constant). Although the upper limit is not particularly limited, satisfactory performance is obtained when "a" is 100 or less.

A film having characteristics which satisfy the ranges of Δn and "a" easily develops a phase difference after stretching and is industrially advantageous due to its high phase difference controllability.

The film of the present invention has a total light transmittance of preferably 88% or more, more preferably 90% or more. The haze value of the film is preferably 5% or less, more preferably 3% or less. Since the film of the present invention has excellent transparency, it is preferred as an optical film.

The film of the present invention may be used alone, or a laminate of two or more of the films may be used. It may also be used in combination with an optical film made from another material. It may be used as a protective film for polarizing plates or a transparent substrate for liquid crystal displays.

EXAMPLES

The following examples are provided for the purpose of further illustrating the present invention but are in no way to be taken as limiting. "Parts" in the following examples means parts by weight and "%" means wt %. The examples were evaluated by the following methods.

(1) Specific Viscosity ($\eta_{sp}$)

A pellet was dissolved in methylene chloride to a concentration of 0.7 g/dL to measure the specific viscosity of the resulting solution at 20° C. with an Ostwald's viscometer (RIGO AUTO VISCOSIMETER TYPE VMR-0525•PC). The specific viscosity ($\eta_{sp}$) was obtained from the following equation.

$$\eta_{sp} = t/t_o - 1$$

t: flow time of a specimen solution
$t_o$: flow time of a solvent alone (2) Content of Terminal Modifying Group $^1$H-NMR of the pellet in a heavy chloroform solution was measured with the JNM-AL400 of JEOL Corporation to obtain the content of a terminal modifying group from the integration ratio of a specific proton derived from the ether diol to a specific proton derived from the terminal hydroxyl compound. The content of the terminal modifying group was obtained from the following equation.

$$\text{Content of terminal modifying group} = [Rt] \times \frac{[Mt] \times [Re]}{[Me]} \times 100 \text{ (wt \%)}$$

Rt: ratio of terminal hydroxyl compound to ether diol obtained from integration ratio of $^1$H-NMR
Mt: molecular weight of constituent unit of terminal hydroxyl compound
Re: composition ratio of ether diol in main chain obtained from integration ratio of $^1$H-NMR (in the case of Comparative Examples (copolymerization))
Me: molecular weight of constituent unit of ether diol (3) Glass Transition Temperature (Tg)

The glass transition temperature of the pellet was measured with the DSC (Model DSC2910) of TA Instruments.

(4) 5% Weight Loss Temperature (Td)

The 5% weight loss temperature of the pellet was measured with the TGA (Model TGA2950) of TA Instruments.

(5) Melt Viscosity

The melt viscosity at 600 sec$^{-1}$ of the pellet was read from a shear rate/viscosity curve which was obtained by measuring the pellet with the capillary rheometer (Capillograph Model 1D) of Toyo Seiki Co., Ltd. at a capillary length of 10.0 mm, a capillary diameter of 1.0 mm and a measurement temperature of 250° C. by changing the measurement speed arbitrarily.

(6) Moldability

The pellet was injection molded with the JSWJ-75EIII of The Japan Steel Works, Ltd. to evaluate the shape of a molded plate having a thickness of 2 mm visually (mold temperature: 70 to 90° C., molding temperature: 220 to 260° C.).

Moldability

○; no turbidity, cracking, surface sink or silver streak by decomposition is seen X; a turbidity, cracking, surface sink or silver streak by decomposition is seen (7) Contact Angle The contact angle with pure water of the molded plate having a thickness of 2 mm was measured with the drip type contact angle meter of Kyowa Interface Science Co., Ltd.

(8) Water Absorption Coefficient

The molded plate which had been dried at 100° C. for 24 hours was immersed in water at 25° C., and the weight of the plate was measured after 24 hours to calculate its water absorption coefficient from the following equation.

Water absorption coefficient=(weight of sample plate (after water absorption)−weight of sample plate (before water absorption)/weight of sample plate (before water absorption)×100(wt %)

(9) Film Thickness

The thickness of the film was measured with the film thickness meter of Mitsutoyo Corporation.

(10) Photoelastic Constant

A film having a width of 1 cm and a length of 6 cm was prepared, and the phase differences of this film for light having a wavelength of 550 nm under no load and under a load of 1 N, 2 N and 3 N were measured with the M220 spectro-ellipsometer of JASCO Corporation to calculate (phase difference)×(film width)/(load).

(11) Total Light Transmittance and Haze Value of Film

They were measured with the NDH-2000 turbidimeter of Nippon Denshoku Industries Co., Ltd.

(12) phase difference values (R(450)), R(550)) and their wavelength dispersion (R(450)/R(550))

They were measured at wavelengths of 450 nm and 550 nm with the M220 spectro-ellipsometer of JASCO CORPORATION. The phase difference value for light vertically incident upon the film plane was measured.

Example 1

1,608 parts by weight (11 mols) of isosorbide, 2,403 parts by weight (11.22 mols) of diphenyl carbonate and 60 parts by weight (0.22 mol) of stearyl alcohol were fed to a reactor, and 1.0 part by weight ($1\times10^{-4}$ mol based on 1 mol of the diphenyl carbonate component) of tetramethylammonium hydroxide and $0.9\times10^{-3}$ part by weight ($0.2\times10^{-6}$ mol based on 1 mol of the diphenyl carbonate component) of sodium hydroxide as polymerization catalysts were fed to the reactor and dissolved at 180° C. in a nitrogen atmosphere.

The inside pressure of the reactor was gradually reduced to $13.3\times10^{-3}$ MPa over 30 minutes under agitation while the formed phenol was distilled off. After a reaction was carried out in this state for 20 minutes, the temperature was raised to 200° C., the pressure was gradually reduced to $4.00\times10^{-3}$ MPa over 20 minutes to carry out the reaction for 20 minutes while the phenol was distilled off, and the temperature was further raised to 220° C. to carry out the reaction for 30 minutes and then to 250° C. to carry out the reaction for 30 minutes.

After the pressure was gradually reduced to continue the reaction at $2.67\times10^{-3}$ MPa for 10 minutes and at $1.33\times10^{-3}$ MPa for 10 minutes and further reduced to $4.00\times10^{-5}$ MPa, the temperature was gradually increased to 250° C., and the reaction was carried out at 250° C. and $6.66\times10^{-5}$ MPa for 1 hour in the end. The polymer after the reaction was pelletized to obtain a pellet having a specific viscosity of 0.28 and a terminal modifying group content of 1.7 wt %. Other evaluation results of this pellet are shown in Table 1.

Example 2

1,608 parts by weight (11 mols) of isosorbide and 89 parts by weight (0.33 mol) of stearyl alcohol were fed to a reactor equipped with a thermometer and a stirrer, the inside of the reactor was substituted by nitrogen, and 8,900 parts by weight of well dried pyridine and 32,700 parts by weight of methylene chloride were added to dissolve the above substances. 1,420 parts by weight (14.30 mols) of phosgene was blown for 100 minutes under agitation at 20° C. After the blowing of phosgene, stirring was carried out for about 20 minutes to terminate the reaction. The product after the end of the reaction was diluted with methylene chloride, pyridine was neutralized with hydrochloric acid to be removed, the obtained product was rinsed with water repeatedly until its conductivity became almost equal to that of ion exchange water, and methylene chloride was evaporated to obtain a powder. The obtained powder was melt extruded into a strand which was then cut to obtain a pellet. This pellet had a specific viscosity of 0.38 and a terminal modifying group content of 4.9 wt %. Other evaluation results of this pellet are shown in Table 1.

Example 3

Polymerization was carried out in the same manner as in Example 1 to obtain a pellet except that 1,608 parts by weight (11 mols) of isosorbide, 2,427 parts by weight (11.33 mols) of diphenyl carbonate and 134 parts by weight (0.44 mol) of 3-pentadecylphenol were used. The obtained pellet had a specific viscosity of 0.24 and a terminal modifying group content of 5.6 wt %. Other evaluation results of this pellet are shown in Table 1.

Example 4

Polymerization was carried out in the same manner as in Example 1 to obtain a pellet except that 1,608 parts by weight (11 mols) of isosorbide, 2,403 parts by weight (11.22 mols) of diphenyl carbonate and 67 parts by weight (0.66 mol) of 1-hexanol were used. This pellet had a specific viscosity of 0.23 and a terminal modifying group content of 2.6 wt %. Other evaluation results of this pellet are shown in Table 1.

Example 5

Polymerization was carried out in the same manner as in Example 1 to obtain a pellet except that 1,608 parts by weight (11 mols) of isosorbide, 2,356 parts by weight (11 mols) of diphenyl carbonate and 11 parts by weight (0.01 mol) of one terminal reactive polydimethylsiloxane represented by the following formula (12) (n=9) were used. This pellet had a specific viscosity of 0.32 and a terminal modifying group content of $5.4\times10^{-1}$ wt %. Other evaluation results of this pellet are shown in Table 1.

(12)

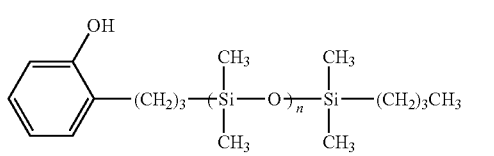

Example 6

Polymerization was carried out in the same manner as in Example 1 to obtain a pellet except that 1,608 parts by weight (11 mols) of isosorbide, 2,356 parts by weight (11 mols) of diphenyl carbonate and 19 parts by weight (0.033 mol) of 4-hydroxybenzoate-4,4,5,5,6,6,7,7,8,8,9,9,10,10,11,11,11-heptadecafluoroundecyl ester (following formula (13)) were used. This pellet had a specific viscosity of 0.33 and a terminal modifying group content of $5.5 \times 10^{-1}$ wt %. Other evaluation results of this pellet are shown in Table 1.

(13)

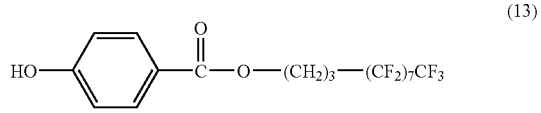

Example 7

1,559 parts by weight (10.67 mols) of isosorbide, 25.1 parts by weight (0.33 mol) of 1,3-propanediol, 2,380 parts by weight (11.11 mols) of diphenyl carbonate and 60 parts by weight (0.22 mol) of stearyl alcohol were fed to a reactor, and 1.0 part by weight ($1 \times 10^{-4}$ mol based on 1 mol of the diphenyl carbonate component) of tetramethylammonium hydroxide and $0.9 \times 10^{-3}$ part by weight ($0.2 \times 10^{-6}$ mol based on 1 mol of the diphenyl carbonate component) of sodium hydroxide as polymerization catalysts were fed to the reactor and dissolved at 180° C. in a nitrogen atmosphere.

The inside pressure of the reactor was gradually reduced to $13.3 \times 10^{-3}$ MPa over 30 minutes under agitation while the formed phenol was distilled off. After a reaction was carried out in this state for 20 minutes, the temperature was raised to 200° C., the pressure was gradually reduced to $4.00 \times 10^{-3}$ MPa over 20 minutes to carry out the reaction for 20 minutes while the phenol was distilled off, and the temperature was further raised to 220° C. to carry out the reaction for 30 minutes and then to 240° C. to carry out the reaction for 30 minutes.

After the pressure was gradually reduced to continue the reaction at $2.67 \times 10^{-3}$ MPa for 10 minutes and at $1.33 \times 10^{-3}$ MPa for 10 minutes and further reduced to $4.00 \times 10^{-5}$ MPa, the temperature was gradually increased to 250° C., and the reaction was carried out at 250° C. and $6.66 \times 10^{-5}$ MPa for 1 hour in the end. The polymer after the reaction was pelletized to obtain a pellet having a specific viscosity of 0.25 and a terminal modifying group content of 1.5 wt %. Other evaluation results of this pellet are shown in Table 1.

Example 8

1,527 parts by weight (10.45 mols) of isosorbide, 78.2 parts by weight (0.55 mol) of 1,4-cyclohexanedimethanol, 2,403 parts by weight (11.22 mols) of diphenyl carbonate and 60 parts by weight (0.22 mol) of stearyl alcohol were fed to a reactor, and 1.0 part by weight ($1 \times 10^{-4}$ mol based on 1 mol of the diphenyl carbonate component) of tetramethylammonium hydroxide and $0.9 \times 10^{-3}$ part by weight ($0.2 \times 10^{-6}$ mol based on 1 mol of the diphenyl carbonate component) of sodium hydroxide as polymerization catalysts were fed to the reactor and dissolved at 180° C. in a nitrogen atmosphere.

The inside pressure of the reactor was gradually reduced to $13.3 \times 10^{-3}$ MPa over 30 minutes under agitation while the formed phenol was distilled off. After a reaction was carried out in this state for 20 minutes, the temperature was raised to 200° C., the pressure was gradually reduced to $4.00 \times 10^{-3}$ MPa over 20 minutes to carry out the reaction for 20 minutes while the phenol was distilled off, and the temperature was further raised to 220° C. to carry out the reaction for 30 minutes and then to 240° C. to carry out the reaction for 30 minutes.

After the pressure was gradually reduced to continue the reaction at $2.67 \times 10^{-3}$ MPa for 10 minutes and at $1.33 \times 10^{-3}$ MPa for 10 minutes and further reduced to $4.00 \times 10^{-5}$ MPa, the temperature was gradually increased to 250° C., and the reaction was carried out at 250° C. and $6.66 \times 10^{-5}$ MPa for 1 hour in the end. The polymer after the reaction was pelletized to obtain a pellet having a specific viscosity of 0.33 and a terminal modifying group content of 1.8 wt %. Other evaluation results of this pellet are shown in Table 1.

Comparative Example 1

1,461 parts by weight (10 mols) of isosorbide and 2,142 parts by weight (10 mols) of diphenyl carbonate were fed to a reactor, and 1.0 part by weight ($1 \times 10^{-4}$ mol based on 1 mol of the diphenyl carbonate component) of tetramethylammonium hydroxide and $5.4 \times 10^{-3}$ part by weight ($0.2 \times 10^{-6}$ mol based on 1 mol of the diphenyl carbonate component) of 2,2-bis(4-hydroxyphenyl) propane disodium salt as polymerization catalysts were fed to the reactor and dissolved at 180° C. in a nitrogen atmosphere.

The inside pressure of the reactor was gradually reduced to $13.3 \times 10^{-3}$ MPa over 30 minutes under agitation while the formed phenol was distilled off. After a reaction was carried out in this state for 20 minutes, the temperature was raised to 200° C., the pressure was gradually reduced to $4.00 \times 10^{-3}$ MPa over 20 minutes to carry out the reaction for 20 minutes while the phenol was distilled off, and the temperature was further raised to 220° C. to carry out the reaction for 30 minutes and then to 250° C. to carry out the reaction for 30 minutes.

After the pressure was gradually reduced to continue the reaction at $2.67 \times 10^{-3}$ MPa for 10 minutes and at $1.33 \times 10^{-3}$ MPa for 10 minutes and further reduced to $4.00 \times 10^{-5}$ MPa, the temperature was gradually increased to 260° C., and the reaction was carried out at 260° C. and $6.66 \times 10^{-5}$ MPa for 2 hours in the end. The polymer after the reaction was pelletized to obtain a pellet having a specific viscosity of 0.36. In this case, since a hydroxy compound which could cause terminal modification was not added, the terminal modifying group content became 0 wt %. Other evaluation results of this pellet are shown in Table 1.

Comparative Example 2

Polymerization was carried out in the same manner as in Example 1 to obtain a pellet except that 1,608 parts by weight (11 mols) of isosorbide, 2,474 parts by weight (11.55 mols) of diphenyl carbonate and 268 parts by weight (0.88 mol) of 3-pentadecylphenol were used. This pellet had a specific viscosity of 0.16 and a terminal modifying group content of 9.1 wt %. Other evaluation results of this pellet are shown in Table 1.

Comparative Example 3

1,366 parts by weight (9.35 mols) of isosorbide, 195 parts by weight (1.65 mols) of 1,6-hexanediol and 2,356 parts by weight (11 mols) of diphenyl carbonate were fed to a reactor, and 1.0 part by weight ($1 \times 10^{-4}$ mol based on 1 mol of the diphenyl carbonate component) of tetramethylammonium hydroxide and $5.4 \times 10^{-3}$ part by weight ($0.2 \times 10^{-6}$ mol based on 1 mol of the diphenyl carbonate component) of 2,2-bis(4-hydroxyphenyl)propane disodium salt as polymerization catalysts were fed to the reactor and dissolved at 180° C. in a nitrogen atmosphere. The inside pressure of the reactor was gradually reduced to $13.3 \times 10^{-3}$ MPa over 30 minutes under agitation while the formed phenol was distilled off. After a reaction was carried out in this state for 20 minutes, the temperature was raised to 200° C., the pressure was gradually reduced to $4.00 \times 10^{-3}$ MPa over 20 minutes to carry out the reaction for 20 minutes while the phenol was distilled off, and the temperature was further raised to 220° C. to carry out the reaction for 30 minutes and then to 250° C. to carry out the reaction for 30 minutes. After the pressure was gradually reduced to continue the reaction at $2.67 \times 10^{-3}$ MPa for 10 minutes and at $1.33 \times 10^{-3}$ MPa for 10 minutes and further reduced to $4.00 \times 10^{-5}$ MPa, the temperature was gradually increased to 240° C., and the reaction was carried out at 240° C. and $6.66 \times 10^{-5}$ MPa for 1 hour in the end. The polymer after the reaction was pelletized to obtain a pellet having a specific viscosity of 0.26. In this case, since a hydroxy compound which could cause terminal modification was not added, the terminal modifying group content became 0 wt %. Other evaluation results of this pellet are shown in Table 1.

TABLE 1

| | unit | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Isosorbide | mol | 11.00 | 11.00 | 11.00 | 11.00 | 11.00 | 11.00 | 10.67 | 10.45 |
| Diphenyl carbonate | mol | 11.22 | — | 11.33 | 11.22 | 11.00 | 11.00 | 11.11 | 11.22 |
| Stearyl alcohol | mol | 0.22 | 0.33 | | | | | 0.22 | 0.22 |
| Pentadecylphenol | mol | | | 0.44 | | | | | |
| 1-hexanol | mol | | | | 0.66 | | | | |
| Formula (12) | mol | | | | | 0.01 | | | |
| Formula (13) | mol | | | | | | 0.033 | | |
| 1,3-propanediol | mol | | | | | | | 0.33 | |
| 1,4-cyclohexane-dimethanol | mol | | | | | | | | 0.55 |
| Specific viscosity | none | 0.28 | 0.38 | 0.24 | 0.23 | 0.32 | 0.33 | 0.25 | 0.33 |
| Terminal modifying group content | wt % | 1.7 | 4.9 | 5.6 | 2.6 | 0.54 | 0.55 | 1.5 | 1.8 |
| Glass transition temperature | ° C. | 150 | 147 | 140 | 148 | 163 | 164 | 143 | 141 |
| 5% weight loss temperature | ° C. | 352 | 356 | 355 | 352 | 350 | 353 | 332 | 349 |
| Melt viscosity (250° C., 600 sec$^{-1}$) | $\times 10^{-3}$ Pa·s | 0.76 | 1.03 | 0.22 | 0.37 | 1.21 | 1.36 | 0.71 | 0.73 |
| Moldability | Visual check | ○ | ○ | ○ | ○ | ○ | ○ | ○ | ○ |
| Contact angle | ° | 78 | 79 | 80 | 71 | 93 | 90 | 70 | 73 |
| Water absorption coefficient (24 h) | % | 0.67 | 0.64 | 0.64 | 0.72 | 0.51 | 0.54 | 0.62 | 0.65 |

| | unit | C. Ex. 1 | C. Ex. 2 | C. Ex. 3 |
|---|---|---|---|---|
| Isosorbide | mol | 10.00 | 11.00 | 9.35 |
| 1,6-hexanediol | mol | 0 | 0 | 1.65 |
| Diphenyl carbonate | mol | 10.00 | 11.55 | 11.00 |
| Pentadecylphenol | mol | | 0.88 | |
| Specific viscosity | none | 0.36 | 0.16 | 0.26 |
| Terminal modifying group content | wt % | 0.0 | 9.1 | 0.0 |
| Glass transition temperature | ° C. | 165 | 126 | 123 |
| 5% weight loss temperature | ° C. | 358 | 349 | 342 |
| Melt viscosity (250° C., 600 sec$^{-1}$) | $\times 10^{-3}$ Pa·s | 1.58 | 0.04 | 0.19 |
| Moldability | Visual check | X | X | ○ |
| Contact angle | ° | 62 | 81 | 69 |
| Water absorption coefficient (24 h) | % | 0.84 | 0.62 | 0.80 |

Ex.: Example
C. Ex.: Comparative Example

Example 9

A film was made from the terminal modified polycarbonate resin obtained in Example 1 by using the KZW15-30MG film molding machine (of TECHNOBEL CORPORATION) and the KYA-2H-6 roll temperature control machine (of KATO-RIKI MFG. CO., LTD.) in accordance with the melt film forming method. The cylinder temperature of an extruder was maintained at 220 to 260° C., and the roll temperature was 140 to 160° C. The physical properties of the obtained film are shown in Table 2.

Comparative Example 4

The polycarbonate resin obtained in Comparative Example 3 was dissolved in methylene chloride to obtain a solution having a concentration of 18 wt %. The solution was cast over a stainless steel substrate and dried by heating at 40° C. for 20 minutes and at 60° C. for 30 minutes, and the obtained film was removed from the substrate and then dried at 60° C. for 30 minutes, 80° C. for 30 minutes, 100° C. for 1 hour, 120° C. for 1 hour and 140° C. for 1 hour by gently fixing the periphery of the film. The physical properties of the obtained film are shown in Table 2.

Comparative Example 5

A film was formed by using the Panlite (registered trademark) L1225 of Teijin Chemicals Ltd. which is a bisphenol A polycarbonate resin, the KZW15-30MG film molding machine (of TECHNOBEL CORPORATION) and the KYA-2H-6 roll temperature control machine (of KATO-RIKI MFG. CO., LTD.) in accordance with the melt film forming method. The cylinder temperature of an extruder was maintained at 260 to 300° C., and the roll temperature was 140 to 160° C. The physical properties of the obtained film are shown in Table 2. As compared with the polycarbonate film of Example 7, it is seen that this film had a higher photoelastic constant and a large wavelength dispersion of phase difference values.

TABLE 2

|  | unit | Ex. 9 | C. Ex. 4 | C. Ex. 5 |
|---|---|---|---|---|
| Film thickness | μm | 90 | 47 | 139 |
| Photoelastic constant | ×10$^{-12}$Pa$^{-1}$ | 12 | 26 | 81 |
| Total light transmittance | % | 90 | 92 | 91 |
| Haze | % | 0.5 | 0.7 | 0.3 |
| R(550) | nm | 7.1 | 11.8 | 44 |
| R(450)/R(550) |  | 1.026 | 1.022 | 1.071 |
| Δn |  | 0.08 | 0.25 | 0.32 |

Ex.: Example
C. Ex.: Comparative Example

Examples 10 to 12

The unstretched terminal modified polycarbonate film obtained in Example 9 was monoaxially stretched at three different draw ratios at a stretching temperature of 150 to 160° C. by using a stretching machine to obtain stretched films. The physical properties such as phase difference values and their wavelength dispersions of these stretched films are shown in Table 3.

Comparative Examples 6 and 7

The polycarbonate film obtained in Comparative Example 4 was monoaxially stretched at two different draw ratios at a stretching temperature of 120° C. by using a stretching machine to obtain stretched films. The physical properties such as phase difference values and their wavelength dispersions of these stretched films are shown in Table 3. As compared with the terminal modified polycarbonate films of Examples 10 to 12, it is seen that a phase difference after stretching was hardly developed, the wavelength dispersion of phase difference values was large, and phase difference controllability was low.

TABLE 3

|  |  | unit | Ex. 10 | Ex. 11 | Ex. 12 | C. Ex. 6 | C. Ex. 7 |
|---|---|---|---|---|---|---|---|
| Stretching conditions | Stretching temperature | ° C. | 160 | 160 | 160 | 120 | 120 |
|  | Draw ratio | times | 1.2 | 1.5 | 2.2 | 1.2 | 1.5 |
| Physical properties of film | Film thickness | μm | 84 | 80 | 69 | 44 | 39 |
|  | R(550) | nm | 162 | 475 | 1158 | 47 | 154 |
|  | R(450)/R(550) |  | 1.019 | 1.025 | 1.025 | 1.025 | 1.038 |
|  | Δn |  | 1.95 | 5.98 | 16.78 | 1.07 | 3.95 |

Ex.: Example
C. Ex.: Comparative Example

Effect of the Invention

The terminal modified polycarbonate of the present invention has a main chain essentially composed of a recurring unit derived from biogenic matter and a high content of the biogenic matter. The terminal modified polycarbonate of the present invention has excellent heat resistance and heat stability. The terminal modified polycarbonate of the present invention has a low melt viscosity in spite of a high content of biogenic matter and excellent moldability. Although the terminal modified polycarbonate of the present invention contains an ether diol component having high polarity, it is excellent in moisture absorption resistance as well as the dimensional stability and moist heat stability of its molded product. The terminal modified polycarbonate of the present invention has high surface energy, is hardly stained and has excellent abrasion resistance.

According to the manufacturing process of the present invention, there can be obtained a terminal modified polycarbonate which contains a moiety derived from biogenic matter and has excellent heat resistance, heat stability, moldability and moist absorption resistance and high surface energy.

The optical film of the present invention has a low photoelastic constant, high phase difference developability and phase difference controllability, and excellent view angle characteristics, heat resistance and heat stability.

Industrial Applicability

The terminal modified polycarbonate of the present invention can be used in a film. The film of the present invention can be advantageously used as a protective film for polarizing plates and a transparent substrate for liquid crystal displays.

The invention claimed is:

1. A terminal modified polycarbonate which has a main chain essentially composed of a recurring unit represented by the following formula (1):

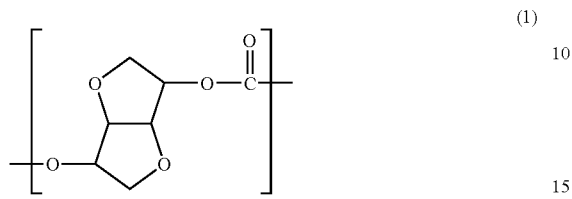

has a specific viscosity at 20° C. of a solution obtained by dissolving 0.7 g of the polycarbonate in 100 ml of methylene chloride of 0.2 to 0.5, and contains a terminal group represented by the following formula (2) or (3) in an amount of 0.3 to 9 wt % based on the main chain:

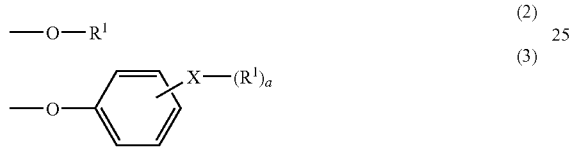

wherein $R^1$ is an alkyl group having 4 to 30 carbon atoms, aralkyl group having 7 to 30 carbon atoms, perfluoroalkyl group having 4 to 30 carbon atoms or a group represented by the following formula (4):

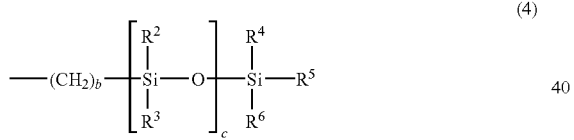

wherein $R^2$, $R^3$, $R^4$, $R^5$ and $R^6$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms, b is an integer of 0 to 3, and c is an integer of 4 to 100, X is at least one bond selected from the group consisting of a single bond, ether bond, thioether bond, ester bond, amino bond and amide bond, and a is an integer of 1 to 5.

2. The terminal modified polycarbonate according to claim 1 which contains a terminal group represented by the formula (2) or (3) in an amount of 0.3 to 7.5 wt % based on the main chain.

3. The terminal modified polycarbonate according to claim 1 which has a contact angle with water of 70 to 180°.

4. The terminal modified polycarbonate according to claim 1 which has a water absorption coefficient at 23° C. after 24 hours of 0.8% or less.

5. The terminal modified polycarbonate according to claim 1, wherein the recurring unit represented by the formula (1) is a unit derived from isosorbide (1,4:3,6-dianhydro-D-sorbitol).

6. The terminal modified polycarbonate according to claim 1, wherein the terminal group represented by the formula (2) or (3) is derived from biogenic matter.

7. A process of manufacturing a terminal modified polycarbonate, comprising reacting an ether diol (component A) represented by the following formula (5):

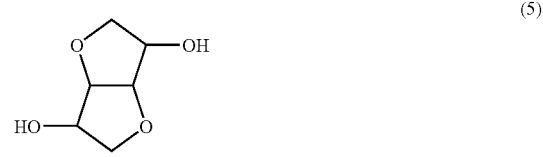

a diester carbonate (component B) and 0.3 to 15 wt % based on the component A of a hydroxyl compound (component C) represented by the following formula (6) or (7) with one another:

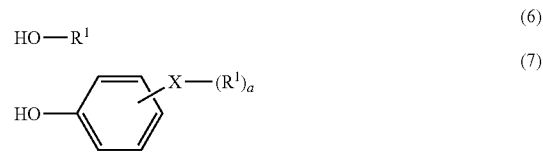

wherein $R^1$ is an alkyl group having 4 to 30 carbon atoms, aralkyl group having 7 to 30 carbon atoms, perfluoroalkyl group having 4 to 30 carbon atoms or a group represented by the following formula (4):

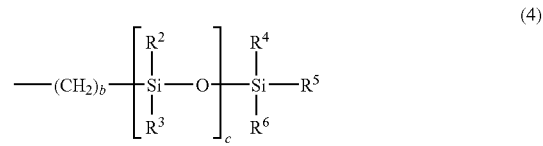

wherein $R^2$, $R^3$, $R^4$, $R^5$ and $R^6$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms, b is an integer of 0 to 3, and c is an integer of 4 to 100, X is at least one bond selected from the group consisting of a single bond, ether bond, thioether bond, ester bond, amino bond and amide bond, and a is an integer of 1 to 5.

8. The manufacturing process according to claim 7, wherein the amount of the diester carbonate (component B) is 1.05 to 0.97 mol based on 1 mol of the ether diol (component A).

9. The manufacturing process according to claim 7, wherein the ether diol (component A), the diester carbonate (component B) and the hydroxyl compound (component C) are reacted with one another under heating at normal pressure and then melt polycondensed while they are heated at 180 to 280° C. under a reduced pressure.

10. The manufacturing process according to claim 7, wherein at least one compound selected from the group consisting of a nitrogen-containing basic compound, alkali metal compound and alkali earth metal compound is used as a polymerization catalyst.

11. The manufacturing process according to claim 7, wherein the ether diol component (component B) is isosorbide (1,4:3,6-dianhydro-D-sorbitol).

12. The manufacturing process according to claim 7, wherein the hydroxyl compound (component C) is derived from biogenic matter.

13. A process of manufacturing a terminal modified polycarbonate, comprising reacting an ether diol (component A) represented by the following formula (5):

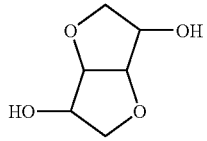

with phosgene (component D) in an inert solvent in the presence of an acid binder, wherein
a hydroxyl compound (component C) represented by the following formula (6) or (7) is reacted as a terminal capping agent $$HO-R^1 \quad (6)$$

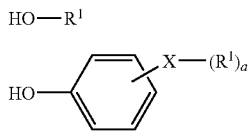

wherein $R^1$ is an alkyl group having 4 to 30 carbon atoms, aralkyl group having 7 to 30 carbon atoms, perfluoroalkyl group having 4 to 30 carbon atoms or a group represented by the following formula (4):

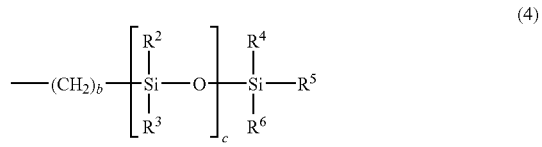

wherein $R^2$, $R^3$, $R^4$, $R^5$ and $R^6$ are each independently at least one group selected from the group consisting of an alkyl group having 1 to 10 carbon atoms, cycloalkyl group having 6 to 20 carbon atoms, alkenyl group having 2 to 10 carbon atoms, aryl group having 6 to 10 carbon atoms and aralkyl group having 7 to 20 carbon atoms, b is an integer of 0 to 3, and c is an integer of 4 to 100, X is at least one bond selected from the group consisting of a single bond, ether bond, thioether bond, ester bond, amino bond and amide bond, and a is an integer of 1 to 5.

14. The manufacturing process according to claim 13, wherein the acid binder is at least one selected from the group consisting of pyridine, quinoline and dimethylaniline.

15. The manufacturing process according to claim 13, wherein the ether diol is isosorbide(1,4; 3,6-dianhydro-D-sorbitol).

16. The manufacturing process according to claim 13, wherein the hydroxyl compound is derived from biogenic matter.

17. A molded product of the terminal modified polycarbonate of claim 1.

18. The molded product of claim 1 which is a film.

* * * * *